(12) United States Patent
Berger et al.

(10) Patent No.: US 8,448,324 B2
(45) Date of Patent: May 28, 2013

(54) JOINING MAGNESIUM WITH REINFORCED POLYMER COMPOSITE FASTENERS

(75) Inventors: Elisabeth J. Berger, Farmington Hills, MI (US); Peter H. Foss, Oxford, MI (US); Leonid C. Lev, West Bloomfield, MI (US); Jon T. Carter, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 339 days.

(21) Appl. No.: 12/952,246

(22) Filed: Nov. 23, 2010

(65) Prior Publication Data
US 2012/0124816 A1    May 24, 2012

(51) Int. Cl.
*B21D 39/00* (2006.01)
*B23P 11/00* (2006.01)

(52) U.S. Cl.
USPC ............... 29/521; 29/525.06; 29/525.07

(58) Field of Classification Search
USPC ........ 29/521, 524.1, 525.06, 525.07, 525.08, 29/525.09, 469.5
See application file for complete search history.

(56) References Cited

U.S. PATENT DOCUMENTS

| | | | |
|---|---|---|---|
| 2,510,693 A | | 3/1944 | Green |
| 2,458,452 A * | | 1/1949 | Vanni ........................... 417/216 |
| 2,685,813 A * | | 8/1954 | Lampman ........................ 87/1 |
| 4,133,096 A * | | 1/1979 | Falcioni ....................... 29/524.1 |
| 4,478,544 A | | 10/1984 | Strand |
| 4,687,396 A * | | 8/1987 | Berecz ........................... 411/503 |
| 4,736,507 A | | 4/1988 | Berecz et al. |
| 4,831,704 A * | | 5/1989 | Rapp ....................... 29/243.529 |
| 4,897,912 A * | | 2/1990 | Slasinski ..................... 29/432.2 |
| 5,051,020 A * | | 9/1991 | Schleicher .................... 403/282 |
| 5,203,812 A * | | 4/1993 | Eckold et al. ................ 29/522.1 |
| 5,361,483 A | | 11/1994 | Rainville et al. |
| 6,684,479 B2 * | | 2/2004 | Wang et al. ..................... 29/521 |
| 6,732,420 B2 * | | 5/2004 | Wang et al. ................ 29/525.06 |
| 7,996,975 B1 * | | 8/2011 | Denslow ...................... 29/419.1 |
| 8,024,848 B2 * | | 9/2011 | Carter ............................. 29/432 |
| 2008/0149256 A1 * | | 6/2008 | Wang et al. ..................... 156/92 |

\* cited by examiner

*Primary Examiner* — David Bryant
*Assistant Examiner* — Justin Sikorski
(74) *Attorney, Agent, or Firm* — Reising Ethington P.C.

(57) ABSTRACT

A method is disclosed for forming corrosion-resistant joints in a plurality of overlapping thin metal sheet workpieces, at least one of which comprises at least 85% by weight of magnesium sheets. The fastener is a fiber-reinforced polymer rod shaped and sized for insertion into a coaxial opening formed in each sheet and subsequently upset on each end to form a head. The workpiece sheets are deformed to form mechanically-interfering features which cooperatively complement the strength of the fastener, under at least some joint loading patterns. The method may be used for other workpiece and fastener compositions.

20 Claims, 4 Drawing Sheets

JOINING MAGNESIUM WITH REINFORCED POLYMER COMPOSITE FASTENERS

TECHNICAL FIELD

This invention pertains to methods of forming high lap shear strength joints in thin sheet metal components, one or more of which may be a magnesium alloy, using fiber-reinforced thermoplastic or thermosetting fasteners in cooperation with mechanically-interfering structures formed by deforming the sheets.

BACKGROUND OF THE INVENTION

The increasing application of high strength-to-weight-ratio materials is one of several strategies adopted in pursuit of increased automobile fuel economy, and current automobiles incorporate a wide variety of such materials including high strength steel, high performance aluminum alloys and magnesium alloys. Among this variety of higher strength-to-weight-ratio materials, magnesium and its alloys are attractive, due to the low density of magnesium coupled with their ability to achieve acceptably high strength when suitably processed.

Magnesium is the most chemically active of the commonly-used automotive structural metals and, unless protected, will tend to corrode when exposed to aqueous solutions, particularly when the aqueous solutions are in contact with other metals or contain metallic ions. Treatments and processes to minimize these corrosion tendencies of automotive magnesium alloys have been developed, but in the attachment of magnesium alloys to dissimilar metals, a galvanic cell may be established in the presence of an aqueous electrolyte. In such a cell, the magnesium component will be anodic and preferentially corrode.

Such a cell may be established when mechanical fasteners such as rivets, bolts or screws are used. These fasteners are almost universally fabricated from another metal or alloy—most commonly steel or, less frequently, aluminum—and are in intimate contact with the magnesium. Hence, any attachment of, or to, a thin wall or sheet magnesium component by mechanical fasteners which penetrate into or through the magnesium article, may create a path for ingress of electrolyte and foster localized corrosion in the vicinity of the fastener. Such corrosion may occur even if the magnesium article is coated with a barrier coating to inhibit overall corrosion, or even if one magnesium alloy article is joined to another magnesium article.

Thus there is a need for improved methods and fasteners for joining magnesium alloy articles, particularly thin or sheet articles, to other sheet materials, including other magnesium-based alloys.

SUMMARY OF THE INVENTION

Polymer fasteners may be used to enable a lap joint in two or more overlapping thin workpieces, particularly sheet metal workpieces, at least one of which is a magnesium alloy containing more than 85% magnesium by weight. Such fasteners do not create a potential for galvanic corrosion between the fastener and magnesium. But the lap-shear strength of lap joints, formed in generally planar workpieces is primarily dependent on the fastener strength, and unreinforced polymers, in dimensions similar to those of metal fasteners, may not offer sufficient strength.

It is a goal of the invention to promote high lap shear strength joints. Two approaches, which are preferably applied in combination, may be followed. The first employs fiber-reinforced polymer fasteners in preference to unreinforced polymer fasteners; the second approach requires deforming the workpieces so that they mechanically engage one another.

Polymer fasteners comprising polymers reinforced with fibrous reinforcements may be prepared by upsetting the ends of rod-like bodies or slugs formed by extrusion or pultrusion and cut to suitable length. Most often the cross-section of a body will be circular but bodies of other cross-section may be employed without limitation. The fibrous reinforcements may be continuous fibers or as aligned, chopped fibers oriented generally coaxial with the axis of the body and uniformly or non-uniformly distributed within the body cross-section.

The polymer matrix of such a fastener may be a thermoplastic, so that it may be readily shaped at a temperature greater than its glass transition temperature, while retaining maximum strength at ambient temperature, or about 25° C. Suitable matrices may include relatively low performance thermoplastics like polyamide or polypropylene, but in structures which experience the automotive paint bake cycle (160-200° C. for at least 20 minutes), high performance thermoplastics with a relatively high glass transition or crystallization temperature, such as polyphthalamide, polyphenylene sulfide, polyamide-imide, polyether sulphone and polyarylene ketone, among others, are preferred.

Thermosetting polymers (thermosets) may also be employed. Thermosets may offer superior creep resistance and dimensional stability to thermoplastics and may be preferred for applications involving higher temperature exposure. Preferably these will be B-staged epoxies or a cross-linkable thermoset below its $T_g$. B-staged epoxies are those in which only limited reaction between the resin and hardener has taken place so that the product is in a semi-cured, highly-viscous, but deformable state. Deformation may be facilitated at mildly elevated temperatures. Depending on their formulation the partial cure of such B-staged epoxies may occur at room temperature, about 25° C., or at more elevated temperatures. Higher curing temperature thermosets are preferred. Suitable examples include: epoxy resins, such as diglycidyl ether of bisphenol-A-based resin (such as Hexion Epon 828) or novalac-based resin (such as Hexion Epon SU-2.5) cured with an amine, anhydride, or imidazole curing agent; unsaturated polyester resins, such as those based on propylene glycol cured with a peroxide and, optionally, thickened with magnesium oxide; and a vinyl ester resin (such as Ashland Derakane) cured with a peroxide and, optionally, thickened with magnesium oxide. Thus the fastener formed of such a thermoset may be heated to develop full strength in the thermoset. This may be done using heat lamps or by passing the assembled components through an oven. Alternatively curing may be promoted by exposure to ultraviolet light or to an electron beam.

Suitable fiber reinforcements may include glass and aramid fibers. Carbon fibers may also be suitable provided they can be assuredly isolated from the magnesium. Mixed fibers may also be used, and fibers may be braided or otherwise grouped or associated, or incorporated in the matrix as individual fibers. For example, carbon fibers may be positioned in the interior of a braided aramid or glass fiber sleeve to assure isolation of the carbon fibers. Fibers may be generally uniformly distributed across the body cross-section or may be positioned selectively, for example to provide selective reinforcement or to facilitate upsetting with minimal fiber damage, or, as in the case of carbon fibers, to locate them out of possible contact with the workpiece(s). Natural fibers, such as bast fibers, including hemp and jute may also be used.

Such fasteners may preferably be formed-in-place by inserting short rod-like lengths or bodies of the fiber-reinforced polymer in a hole commonly formed in the workpiece stack formed by the overlapping sheets. The hole may be created by drilling or piercing. Piercing may be facilitated by heating at least the magnesium sheet(s) to about 250° C. to enhance its ductility. The diameter of fiber-reinforced polymer, which may be heated to greater than ambient temperature, should be sized for ready entry to the hole while affording minimal clearance between it and the body. The body may be chamfered for ease of insertion.

After insertion in the hole, the body may be advanced until it extends, preferably by about an equivalent amount on either side of the stack, from the top and bottom surfaces of the stack. The lengths of the extending portions should preferably range from about 1.2 to 2 times the hole diameter. Hence, the length of the body should preferably substantially equal the thickness of the workpiece stack plus a distance equal to between 2.4 and 4 times the hole diameter for a generally cylindrical body. The protruding portions of the body may then be upset, to form, on each side of the stack, a head whose size exceeds that of the hole to secure the members of the stack together. The upsetting may be done simultaneously so that approximately equal and opposing loads are applied to each end of the body, or the upsetting may be performed sequentially, provided suitable provision is made for application of a reaction force opposing the upsetting force.

For thermoplastics the body is preferably preheated to a temperature at least greater than the glass transition temperature of the thermoplastic prior to insertion into the hole. For an amorphous polymer, temperatures only slightly above the glass transition temperature may be suitable, while polymers with more crystalline character may require temperatures approaching the melting temperature. Preheating of the entire body will facilitate upsetting and promote deformation in the portion of the body surrounded by the workpieces during upsetting. Thermosets may be inserted and deformed at room temperature but curing will commonly require heating of at least the fastener, for example, using heat lamps or passing the assembly through a furnace or heater. In some applications curing may be conducted in a paint cure oven employing a temperature between about 160° C. and 200° C. or with ultraviolet or electron beam curing.

The head formed by the upsetting operation should extend appreciably beyond the edges of the sheet opening to effectively deny access of water or aqueous salts to the clean metal surface exposed by the hole-making process. The head may be shaped into a simple form, such as a disc or dome, or more complex head geometries may be employed if they better assure continuity of the reinforcing fibers in passing from the shank to the head.

It is preferred that the body diameter, if cylindrical, be sized to between 85% and 95% of the hole diameter to enable easy insertion of the body and to promote more or less uniform compression, rather than buckling, of the portion of the body surrounded by the workpiece stack during upsetting. Under load, a generally uniformly compressed body will expand laterally and spread outward. Thus, the body portion positioned in the workpiece stack opening will expand to tightly engage the clean metal hole edges and again deny electrolyte access. The greater the initial diameter of the body the less the deformation required to fill the hole, and so, larger body dimensions of between 93% and 95% are more preferred, If more precise body positioning may be achieved, and/or if the body can sustain a larger insertion force, yet larger bodies of up to 99% of the hole diameter may be employed to develop a near-interference fit and minimize the need for any expansion of the body portion in the hole opening It may also be preferred to apply a barrier coating, for example a conversion coating, to the sheet opening after forming the hole.

Yet further enhancement of joint strength may be achieved by combining upsetting of the ends of the body with selective, cooperative deformation of the workpieces in the stack.

In a first embodiment, two or more sheets, at least one of which is a magnesium alloy containing more than 85% by weight of magnesium, may be assembled with generally co-planar overlapping regions. At least a portion of the over-lapped region may be deformed to provide, in the sheets, mating protuberant features extending out of the plane of the sheets and will resist their being pulled apart when loaded in the plane of the sheet. To enhance the ductility of the magnesium alloy sheet the deformation may be carried out at a temperature of greater than about 250° C. Heating of the sheet to this temperature may be accomplished by electric resistance heating or any other convenient method, such as electric induction heating, frictional heating or laser heating. If the mating protuberances are pierced and joined together with a polymeric body as just described, then the workpiece protuberances will be pulled into close engagement. The engaging protuberances will mechanically interfere, generating mutual support and promoting increased lap-shear joint strength.

The protuberances may be of any convenient shape and size but flat-bottomed geometries which enable simpler body upsetting, are preferred.

In a second embodiment, a hole, drilled or pierced, is first made in a stack of overlapping workpieces, at least one of which is a magnesium alloy. The hole is then flanged, preferably at a temperature of greater than about 250° C. to enhance the ductility of the magnesium alloy sheet. Flanging may be carried out by supporting one side of the workpiece stack with an annular die centered on the hole and driving a cylindrical form tool into the hole from the other side of the workpiece stack. The cylindrical form tool may have a tapered end sized to enter the hole. The annular die may be sized with an opening substantially equal to the diameter of the cylindrical tool plus twice the thickness of the stack. When the form tool is fully inserted, each of the workpiece layers surrounding the hole has been bent through 90° and formed into a vertical flange. Each vertical flange tightly engages the flanges formed in the adjacent workpieces to create a series of nested, interlocking flanges.

In both the first and second embodiments, the joint is completed by insertion of a fiber-reinforced polymer body, upset and suitably dimensioned to exclude electrolytes as described previously. When such a joint is tested, the nested flanges may interfere with one another and contribute significant strength to the joint which will be additive to the contribution of the fastener. The contribution of the nested flanges may be greatest when the joint is tested in lap shear.

Form tools of other, more complex cross-section, in conjunction with a supporting die of complementary geometry, may be used to create other than a flange of circular outline. For example to restrain relative rotation of the sheets in the plane of the sheets, an oval, triangular or rectangular outline might be employed. It may be preferred to deform the sheets in the stack at elevated temperature, greater than 250° C., to enhance the ductility of the magnesium alloy sheet.

In a third embodiment, the nested flange geometry of the second embodiment may be deformed further by bending it through a further 90° bend to form the flange through a total bend of 180° so that it is bent back on itself. In this configuration, the lower sheets of the stack are trapped between the underside of the upper sheet(s) and the bent-over, flange portion of the upper sheet(s).

The flange may be bent in a predictable and consistent manner, preferably using a 2-piece tool. The first piece supports and guides a second piece which advances to engage the flange edges on a doubly-curved die surface and, with further advance progressively splays the edges outward to roll and bend them into the desired 180° bend. Again, it may be preferred to enhance the ductility of at least the magnesium alloy sheet by heating the nested flange region to at least 250° C. The joint may be completed by insertion of a fiber-reinforced polymer body upset and suitably dimensioned to exclude electrolytes as described previously.

When such a joint is tested, the folded flanges may interfere with one another and contribute significant strength to the joint, additive to the contribution of the reinforced polymer fastener. As with the second embodiment a major enhancement in lap shear strength may be expected. But, because of the more complex deformation, this joint may be expected to display enhanced strength under a wider range of applied load conditions including tension and peel.

In an aspect of the third embodiment the hole-forming tool may form a hole with one or more radially-extending slots extending to the bend line of the flange to separate the flange into a series of arc segments. In a second aspect of the third embodiment the flange-engaging tool may incorporate cutting edges to separate the flange into a series of arc segments. The arc segments of these aspects may be capable of deforming independently to minimize the hoop strain in the flange.

The practices and processes may be applied to other metal and polymer workpieces secured by polymer or metal fasteners to promote cooperative interaction between the workpieces and the fastener and thereby develop stronger joints.

DESCRIPTION OF PREFERRED EMBODIMENTS

The corrodible nature of magnesium and its alloys requires the use of special practices to prevent or inhibit corrosion in magnesium-containing structures. This is particularly important where the magnesium alloy is in electrical contact with another metal in the presence of an aqueous solution. For example, in an application like a motor vehicle door, the lower section of the door, will be exposed to road spray, which may contain de-icing salt or other chemicals.

For at least some applications, the magnesium may be coated or separated from the less corrodible metal by some inert barrier. However, at the point of attachment of the magnesium alloy to the less corrodible metal, direct metal to metal contact will occur. In fact, since a preferred means of attaching magnesium alloys is through the use of mechanical fasteners such as screws, bolts and rivets, among others, even these fasteners may promote galvanic corrosion, since such fasteners are typically fabricated of steel or aluminum. Hence, even in the case where one magnesium alloy is to be attached to another magnesium alloy, the use of mechanical fasteners may require special consideration.

One approach to inhibiting magnesium alloy corrosion due to fasteners is to employ non-corrodible polymer fasteners which may be fiber-reinforced for enhanced strength. For thin magnesium articles, particularly magnesium sheet articles, a preferred attachment device is a fiber reinforced polymer body, inserted into mating holes in a stack of workpieces and upset on each end to form a head or like structure whose underside is in contact with the abutting workpiece surface.

The undersides of each of the heads then clamp the stack together. Simultaneously with formation of the head, the portion of the body within the hole, more commonly called a shank, is compressed and expanded to fill the hole. The ends of the body may be upset to form the heads, either substantially simultaneously or sequentially.

The dimensions of the body should be selected to ensure that the shank does not buckle and that the formed, upset head optimally secures the workpieces. This may be achieved with a body with a shank whose diameter ranges from about 85-95%, more preferably 93-95%, of the hole diameter and which extends beyond the workpiece surface by a distance of between 1.2 and 2 times the hole diameter.

Since the head is to be formed subsequent to insertion of the body into the hole, it is preferred that the fiber-reinforced polymer body, if it comprises a thermoplastic polymer matrix, be heated to a temperature greater than its glass transition temperature. Suitable thermosets, such as B-staged epoxies may be inserted while at ambient temperatures, as may other crosslinkable thermosets provided they are maintained below their $T_g$ or glass transition temperature. Particular examples of suitable B-staged epoxies may include: epoxy resins such as diglycidyl ether of bisphenol-A-based resin cured with an amine or imidazole curing agent; or, polyester or vinyl ester resins cured with a peroxide and, optionally, thickened with magnesium oxide.

A thermoplastic body may be reliably deformed without cracking or fracturing by heating the body to above its glass transition temperature and deforming it in its plastic state. On cooling to below its glass transition temperature the thermoplastic will regain its higher strength and suitably retain the workpieces in the stack. The thermoplastic may be a relatively low performance thermoplastic like polyamide or polypropylene. But, in applications where the thermoplastic would be exposed to the thermal cycle such as that employed to cure the paint of a vehicle body (typically 160-200° C. for at least 20 minutes), high performance thermoplastics with a relatively high glass transition or crystallization temperature, such as polyphthalamide or polyphenylene sulfide, are preferred, but others, including polyamide-imide, polyether sulphone and polyarylene ketone, may be used.

Bodies of thermosetting polymers may require an elevated temperature cure so that they may be inserted and upset at room temperature or about 25° C. After insertion and upsetting, at least local application of heat to the fastener will enable polymer cure and develop maximum fastener strength. Such curing may be promoted, for example, by heat lamps, or, possibly, through the use of heated tooling, or by placing the fastener (and assembly) in an oven or furnace, for example a paint bake oven. It will be appreciated that any of curing processes known in the art may be employed, including exposure to ultraviolet radiation or exposure to electron beams.

The dimensions of the body should be chosen to enhance joint strength while minimizing the size and mass of the body. It may be preferred to reinforce the thermoplastic with fibers, either chopped fibers, or, more preferably continuous fibers. Suitable manufactured fibers may include glass, and aramid fibers. Carbon fibers may also be employed where they would not directly contact any magnesium sheet. Mixed fibers may also be used, and fibers may be incorporated individually or may be assembled into a braided or woven form to enhance cooperative interaction between fibers. Fibers may be generally uniformly distributed across the body cross-section or may be positioned selectively, for example to provide selective reinforcement or to facilitate upsetting with minimal fiber damage. For example, in an aspect of the invention, carbon fibers may be positioned in the interior of a braided aramid or glass fiber sleeve extending along the length of the body to assure isolation of the carbon fibers from the workpieces.

Natural fibers, for example bast fibers, may also be employed. Bast plants are characterized by long, strong fiber bundles that comprise the outer portion of the stalk and include flax, hemp, kenaf, sunn-hemp, ramie, and jute. Such fibers combine a relatively high tensile strength with a relatively low specific gravity of 0.28-0.62 to yield an especially high specific strength, i.e. strength to weight ratio.

A fiber-reinforced body may be readily formed using pultrusion or extrusion to form an extended length of fiber-reinforced material and then cutting the extended length to form bodies of appropriate length. Although the body may preferably be circular in cross-section, both pultrusion and extrusion are suitable for preparing bodies of other than circular cross-section, including irregular cross-sections, if preferred.

Figure 1:
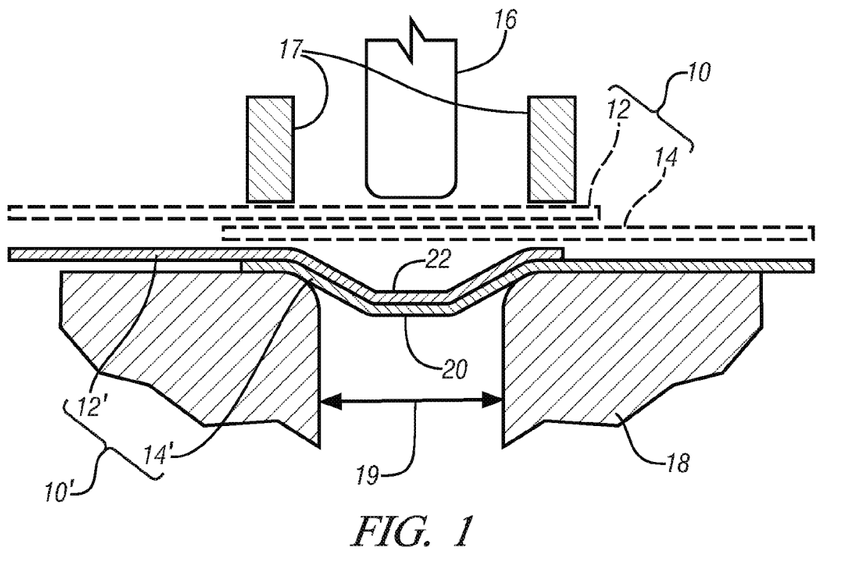
FIG. 1 shows a section through a punch and die suitable for forming nested protuberances on a plurality of overlapping metal sheets.

FIG. 1 shows, in sectional view, a first embodiment of the invention. A workpiece stack 10, consisting of partially-overlapping sheet workpieces, 12 and 14, shown in ghost, supported by die 18 have been indented by flat-bottomed punch 16. Flat-bottomed punch 16 is centered over the throat, or die opening, 19 of die 18. As punch 16 is advanced, first into contact with the workpieces and then into die throat opening 19 the workpieces are subjected to deformation out of the plane of the sheet. Typically buckling of the sheets will be inhibited through the use of binder 17 positioned in opposition to die 18. This out-of-plane deformation of sheets 12 and 14 may form nesting, flat-bottomed, sloping-wall features 20 and 22 in deformed workpiece stack 10' consisting of sheets 12' and 14'. Punch 16 and die throat 19 are of complementary cross-section. It will be appreciated that if punch 16 and die throat 19 are circular in cross-section that flat-bottomed, sloping wall features 20 and 22 will have the form of conical cups. However, other punch and throat cross-sections may be adopted as required for, or preferred for, packaging or other reasons.

At least one of sheets 12 and 14 may be a magnesium alloy. The room temperature formability or ductility of magnesium alloys is generally inferior to that of aluminum alloys and most steels used in automotive bodies. Thus the maximum depth 'D' (FIG. 2) of the depression formed in the workpiece stack will generally be limited by the maximum deformation which the magnesium alloy member may sustain without fracture. It is preferred that depth 'D' at least equal and preferably exceed twice the sheet thickness. If the room temperature ductility of the magnesium sheet is not sufficient to achieve a specified design depth 'D' the ductility of the magnesium alloy sheet may be enhanced by at least locally heating the deformed region to at least 250° C. before forming.

Such heating may be accomplished by electric resistance heating using separate electrodes, or if the die elements of FIG. 1 may be electrically isolated, by passing an electric current between punch 16 and die 18. Electrical induction heating may also be used by locating a coil of suitable geometry adjacent to the region to be deformed. Other approaches, such as frictional heating by rotating punch 16 or laser heating by directing laser illumination on the underside of sheet 14 may also be feasible.

Figure 2:
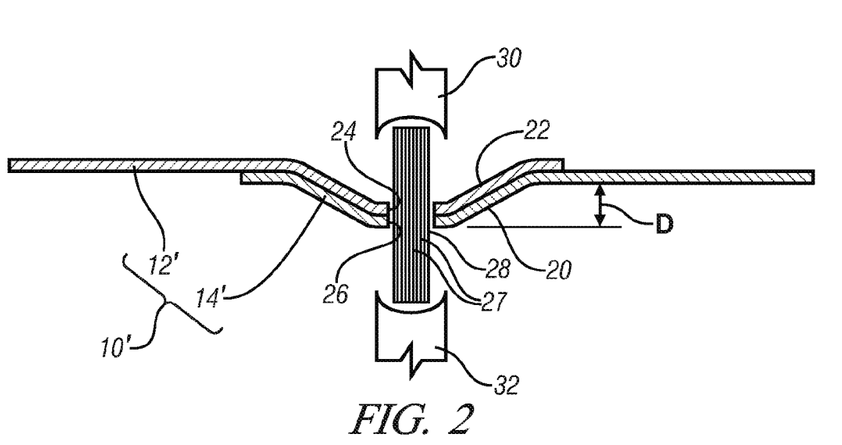
FIG. 2 shows a section through the protuberance of FIG. 1 schematically illustrating upper and lower upsetting tools of a first design positioned to upset a fiber-reinforced polymer body inserted in a hole fabricated in the protuberance.

In FIG. 2, aligned, substantially commonly-sized holes 24 and 26 have been made, for example, by drilling, piercing, laser cutting or other suitable means, in nesting features 20 and 22. As depicted, holes 24 and 26 have been made after the sheets have been subjected to out-of-plane deformation, but this sequence of steps is not required. Holes 24 and 26 may also be made before the sheets undergo the out of plane deformation. When mechanical processes, such as piercing or drilling are used, the magnesium alloy may first be heated to above 250° C. to minimize edge cracks around the hole.

Figure 3:
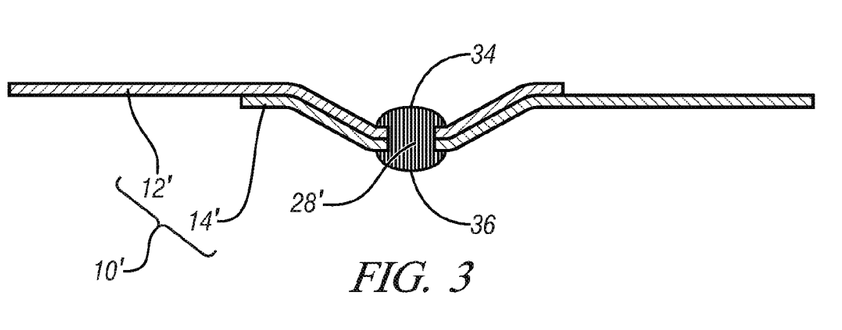
FIG. 3 shows the same section of the joint as shown in FIG. 2 after the ends of the body have been upset to form the joint.

A polymer body 28 reinforced by fibers 27 aligned with its long axis has been inserted in the holes. Tooling to upset the body and shaped to impart a generally domed form to the upset head is shown as an upper tool 30 and a lower tool 32. The body, if a thermoplastic, may be heated to a temperature greater than the glass transition temperature of the thermoplastic. This may be done using, for example, focused radiation like a heat lamp or a laser, or, more simply, by pre-heating the body prior to its insertion in the hole. The body, after reaching the desired temperature may then be promptly upset to form heads 34 and 36 on the end of body 28' as shown in FIG. 3. For simplicity of illustration the fiber orientation in heads 34 and 36 are represented as paralleling the fiber orientation in body portion 28'. It will however be appreciated that the flow of the polymer in heads 34 and 36 will be complex and promote a less regular distribution of fibers in the head portions of the body.

For convenience and ease of representation, this, and other, embodiments are shown with workpiece stacks consisting of only two workpiece sheets. However, those skilled in the art will appreciate that the practices and processes described may readily be extended to workpiece stacks containing more than two workpiece sheets.

Figure 4:
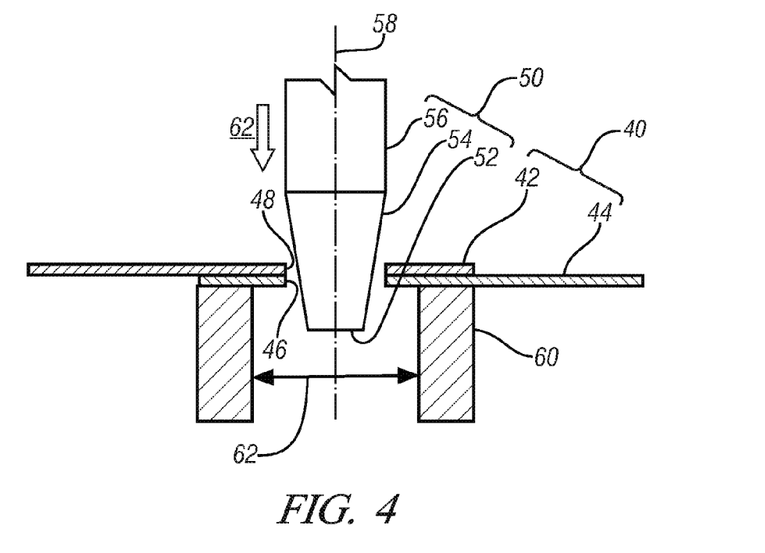
FIG. 4 shows section through two overlapping metal sheets with an opening into which a tapered punch has been partially inserted. The sheets are supported on a die centered on the punch and the opening in the sheets.

A second embodiment of the invention is shown in FIG. 4 which shows, in sectional view, a workpiece stack 40 consisting of workpiece sheets 42 and 44 at least one of which is a magnesium alloy. Aligned, substantially commonly-dimensioned openings bounded by cut edges 48 and 46, have been made in the sheets by one of the previously-described approaches, and workpiece stack 40 has been positioned on die 60, with openings bounded by cut edges 48 and 46 centrally positioned in die throat 62.

Figure 5:
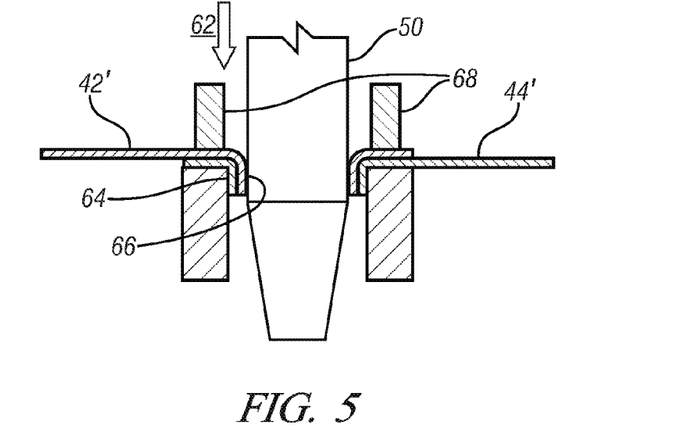
FIG. 5 shows, in sectional view, the configuration of the overlapping metal sheets at the conclusion of the punch stroke and illustrates the formation of a plurality of continuous, nested flanges.

Punch 50, consisting of shank 56, taper 54 and end 52, advances along symmetry axis 58, central to the die throat and substantially perpendicular to the sheet surfaces, in the direction indicated by arrow 62. End 52 of punch 50 is sized and constructed to pass through the opening as is a portion of tapered punch section 54. However the relative dimensions of punch, die opening and sheet stack thickness are such that continued advance of punch 50 will cause tapered section 54 to first engage and then downwardly flange the opening edges 46 and 48. When punch 50 is fully engaged, that is with shank 56 in contact with flange 66, as shown in FIG. 5, fully-formed substantially vertical flanges 64 and 66 have been formed in sheets 44 and 42. Further, flanges 64 and 66 are nested and interfere to restrain lateral motion of deformed sheets 42' and 44'.

Optionally a binder 68, whose center is coaxial with the center of die 60 may be used to impart pressure on sheets 42' and 44' in the direction of arrow 62 to minimize buckling and poor sheet nesting on the unflanged portion of sheets 42' and 44'. The use of binder 68 will be most preferred when the opening bounded by cut edges 46 and 48 are located less than one or two hole diameters from the edges of the sheets.

Punch 50, and complementarily-shaped die throat 62 may have circular cross-sections, but cross-sections of other regular and irregular geometries may be used. It will be appreciated that use of a non-circular cross-section punch and die throat will provide resistance to relative rotation of deformed sheets 42' and 44' in addition to restraining lateral motion. Again, due to the limited room temperature ductility of magnesium alloys it may be beneficial to heat the magnesium alloy to a temperature of greater than 250° C. to avoid cracking.

Analogously to the procedure shown in FIG. 3, a polymer body 70, which may be a thermoplastic (FIG. 6), reinforced by fibers 71, here depicted as chopped discontinuous, fibers oriented parallel to the axis of the body may be inserted into the hole defined by the inner walls 67 of innermost flange 66, heated and upset using shaped dies to form heads 72 and 74 joined by shank 73. Preferably, polymer body 70 is so positioned that it extends sufficiently beyond the end of the flange, cut edges 46, 48, to provide sufficient material for head 74 to encompass cut edges 46, 48. More preferably, as shown in FIG. 6 the flow is sufficiently extensive to fully envelop the flange region and seal against the underside of sheet 44' so that no crevice is created between the fiber-reinforced polymer head and the underside of sheet 44'.

Figure 6:
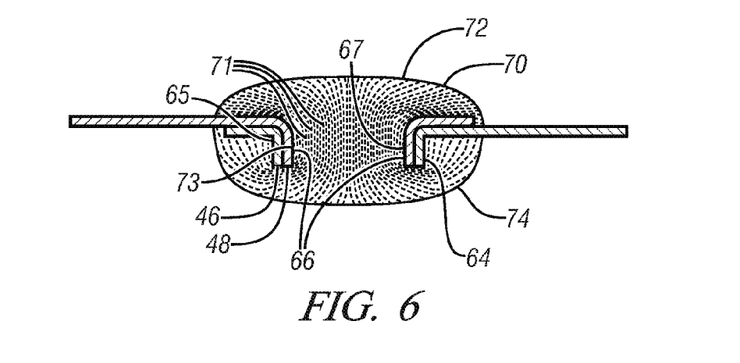
FIG. 6 shows the metal sheet configuration of FIG. 5 after insertion and upsetting of a fiber reinforced polymer body.

In contrast to FIG. 3, the pattern of fibers 71 shown in FIG. 6 is more suggestive of the complex flow undergone by the fiber-reinforced polymer body during upsetting. However such depiction is not intended to be representative of any particular fiber distribution which may be achieved.

Figure 7:
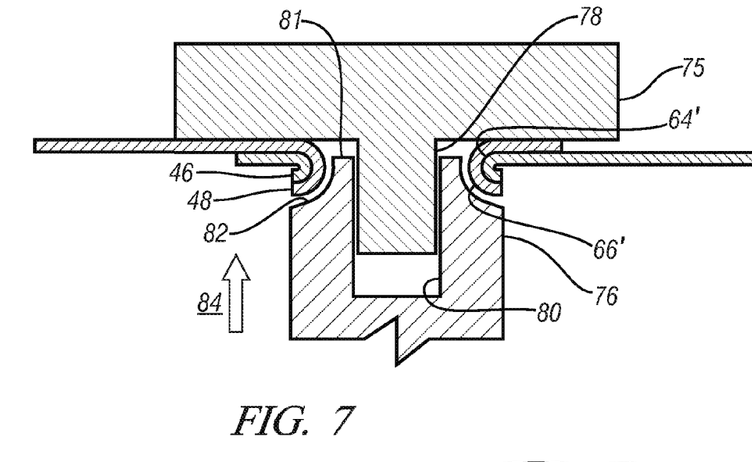
FIG. 7, shows, in cross-section, the further deformation of the nested flanges of FIG. 5 to form a plurality of nested, rolled-over flanges.
Figure 8:
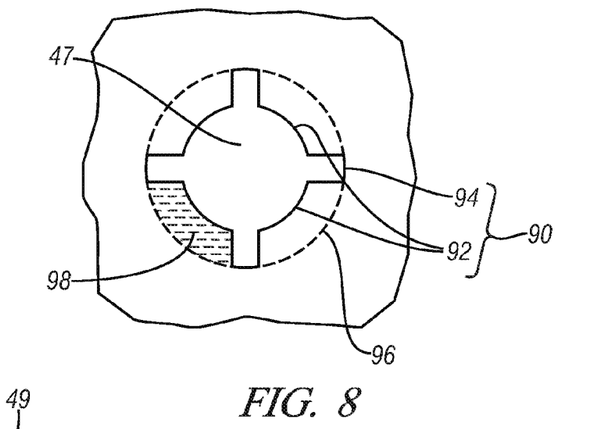
FIG. 8 shows, in plan view, an aspect of the opening geometry formed in the sheets of FIG. 4.
Figure 9:
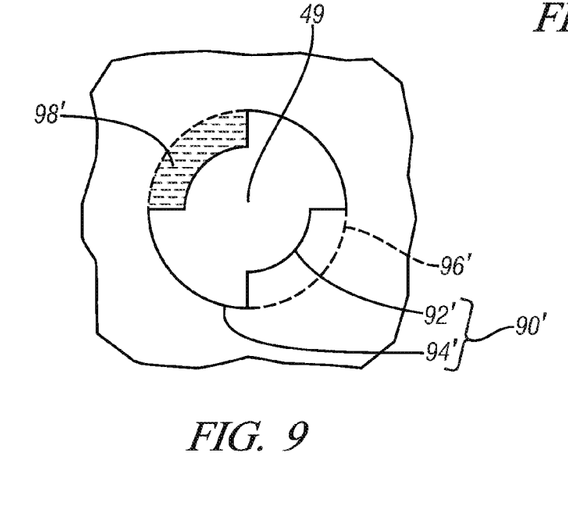
FIG. 9 shows, in plan view, a second aspect of the opening geometry shown in FIG. 4.

A third embodiment is illustrated in FIGS. 7-9. FIG. 7 illustrates the further deformation of flanges 64 and 66 (FIG. 5) by the shaping surface 82 of form tool 76 which further bends the flanges to bend them back on themselves to form nested, rolled-over, flanges 64' and 66'. The end 81 of form tool 76, when directed as shown by arrow 84, is sized and constructed to enter the hole formed by inner walls 67 of inner flange 66 (FIG. 6) so that the cut surfaces 46 and 48 contact curved shaping surface 82 of tool 80. Continued motion of tool 76 will impart a moment to flanges 64 and 66 curling or bending them back on themselves to form rolled-over flanges. Backing plate 75 supports the opposing surface of the workpiece stack, and may, optionally, include features such as protrusion 78 for engagement with cavity 80 of tool 76 for guidance of tool 76.

It will be appreciated that the deformation required to form such rolled-over flanges is considerable and that significant strain will be imposed on the workpiece sheets, particularly at the cut surfaces 46 and 48. It is known that cut edges, like 46 and 48, may crack under tensile strains lower than those required to initiate cracks in the uncut portions. It is therefore again preferred that at least the magnesium alloy sheet be heated to a temperature of greater than 250° C. to enhance its ductility. Optionally, it may be preferred to flange, as in the process shown at FIG. 5, slotted opening 47 or segmented opening 49 such as are shown in FIGS. 8 and 9 to reduce the strain at the cut edge and reduce the likelihood of edge cracking.

As shown in FIG. 8, the edge 90 of opening 47 comprises a plurality of arcuate segments 92, here shown, without limitation, as circular arcs, and a plurality of radially-oriented slots 94 terminating at the bend location 96 (shown in ghost) of the flange. The flange will thus be segmented into a series of generally-abutting flange segments, as an example segment 98, rather than being continuous. In FIG. 9, the number of arcuate segments 92' forming edge 90' opening 49 is reduced and the extent of the gaps 94', analogous to the 'slots' 94 of FIG. 8 is appreciably increased. Thus flanging of segments like 98' by bending along bend line 96' will result in only a few flange segments. However both the configuration of FIG. 8 and of FIG. 9 will produce a series of independent, unattached, flange segments and thereby admit of some relaxation of the flanging strain. The reduction in flanging strain will contribute beneficially to the practices of both embodiment 2 and embodiment 3. Openings 47 and 49, because of their non-circular shape, will preferably be formed by piercing with a shaped tool. Preferably the magnesium sheet may be heated to about 250° C. to improve its ductility and suppress cracking.

Consideration of the form of the holes formed after flanging openings 47 and 49 indicates that they will be of irregular form. To ensure that the fiber reinforced polymer body (for example 28 in FIG. 2) fully expands to fill the opening it may be desirable to employ an undersized body of complementarily-shaped cross-section, requiring that the body be suitably-oriented to the opening.

Figure 10:
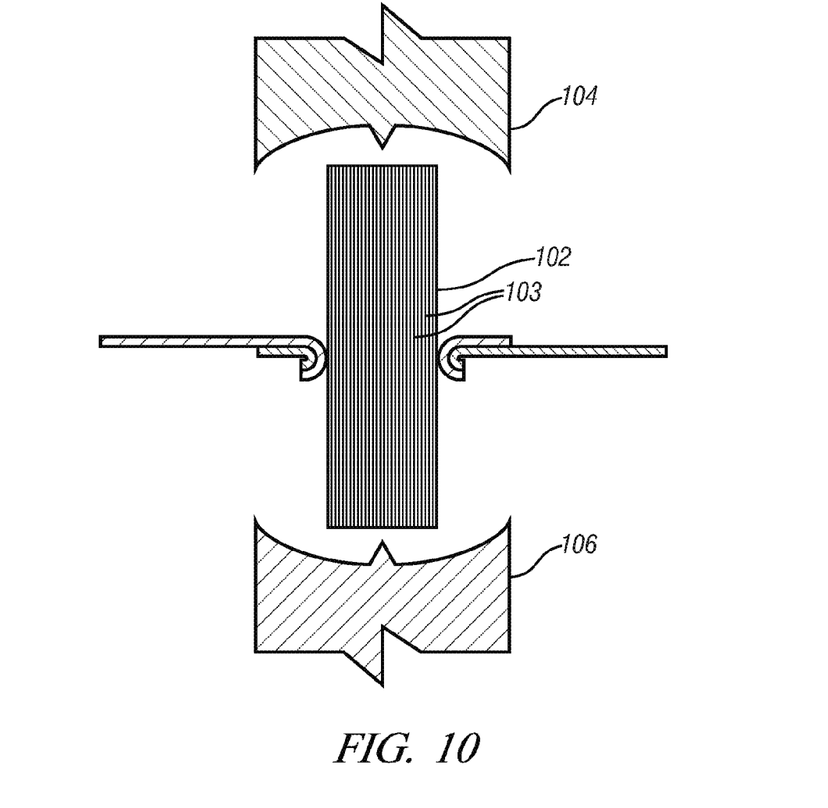
FIG. 10 shows upsetting of a fiber-reinforced polymer body placed within the hole formed in the overlapping sheets with the rolled-over nested flanges using upsetting tools of a second design.

FIG. 10 shows a polymer body 102, which may be a thermoplastic, reinforced by fibers 103, inserted in the opening formed by the nested, rolled-over flanges 64' and 66' (shown in FIG. 7). It is intended that, after heating the body, if a thermoplastic, to above its glass transition temperature, the ends of the body will be upset using forming tools 106 and 104. If the matrix of reinforced polymer body 102 is a thermoset which requires an elevated temperature cure, its glass transition temperature will lie above room temperature and such thermosets also will require some heating prior to upsetting. Thermosets which cure at room temperature may be deformed at room temperature.

Forming tools 104 and 106 differ from forming tools 30 and 32 shown in FIG. 2 in that they incorporate, in addition to the generally domed form of the forming cavity of tools 30 and 32, a sharp-pointed, tapered, protrusion extending outwards from about the center of the cavity. This variation in shape of tools 104 and 106 is intended to be illustrative and not limiting. A wide range of head tool geometries may be employed to better redistribute the longitudinal fibers 103 of body 102 within the head after upsetting.

Figure 11:
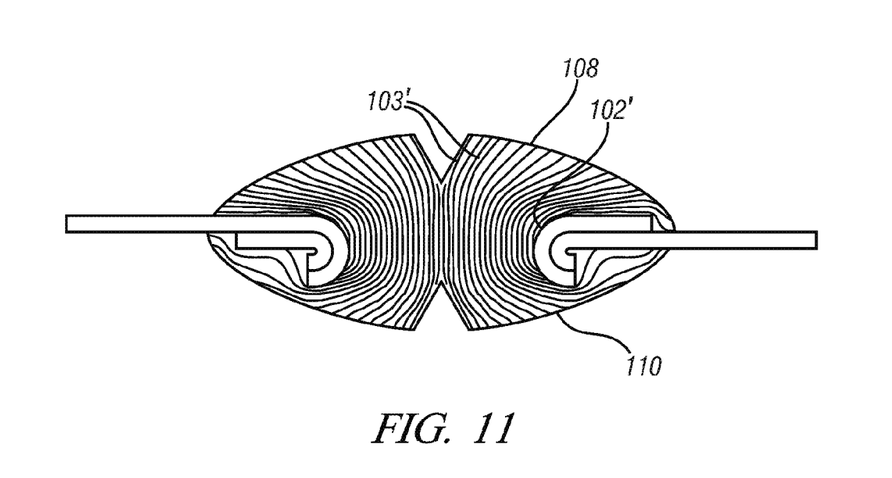
FIG. 11 shows the formed fiber-reinforced polymer body produced by upsetting with the upsetting tools shown in FIG. 8.

The reinforcing fibers of the body or shank are aligned with the axis of the body. If, as in FIG. 2, head forming tools 30 and 32 with generally domed recesses are use in upsetting the ends of the body, the flowable polymer matrix will be systematically deformed into a form complementary to the domed recess. The resulting displacements of the reinforcing fibers however will be more arbitrary and will depend on the nature of the fibers, the fiber concentration, the location of particular fibers and whether or not the fibers are woven or braided or otherwise cooperatively associated with other fibers. The geometry of tools 104 and 106 (FIG. 10) seeks to impart a modest outward inclination to the fibers without inducing appreciable fiber fracture so that at least some fibers may remain continuous. Ideally it is preferred that even the outer fibers which overhang the edges of the hole remain generally continuous as schematically illustrated in FIG. 11 in which fibers 103' are continuous from head 108 through shank 102' to opposing head 110. Again, such representation is intended to be suggestive, rather than representative, of fiber distributions achievable with tools of more complex shape. Although illustrated in conjunction with the practices of the third embodiment, upsetting tools designed for improved control of fiber distribution in the head, including but not limited to the geometry shown, may be applied in all embodiments.

The configuration of FIG. 11 enables mechanical interference between the workpiece sheets which resists out-of-plane loads such as a tensile load applied along the shank axis of the fastener and cooperatively supports the reinforced thermoplastic fastener in resisting such loads.

The described practices and processes enable cooperative interaction between the fastener and the workpieces to develop stronger joints. The practices of the invention have been illustrated by disclosure of some preferred embodiments, and particularly to embodiments in which one or more of the workpieces to be joined is (are) magnesium alloy(s). Such illustrative embodiments are not intended to limit the scope of the invention which is applicable to other joints such as when metallic fasteners are employed to join other workpiece stackups or when polymer fasteners are used to join polymer sheets.

For example, it may be desired to promote a high strength joint in aluminum alloys. Typically aluminum alloys may be deformed at room temperature, or about 25° C. Each of the three described embodiments may be practiced on such an aluminum alloy stack-up by appropriately deforming the sheets of the stack as described. The aluminum sheet stack may then be secured by upsetting a metal or fiber-reinforced polymer body. The body may be an aluminum alloy suitable for deformation at room temperature.

Similarly, thermoplastic polymer sheets may be heated to above their glass transition temperature and deformed according to the practices of the invention. Such formed polymer sheets may be cooled to room temperature and secured using upset metal or polymer or reinforced polymer bodies as previously described.

The invention claimed is:

1. A method for forming a corrosion-resistant joint in an assembly of two or more overlapping sheets, where at least one of the sheets comprises an alloy of magnesium comprising at least 85% by weight of magnesium, each sheet having a top surface and a bottom surface, the method comprising:

assembling the sheets to have a planar overlapping region in which a bottom surface of one sheet lies in face to face contact with a top surface of an underlying sheet, the planar overlapped region having a top surface of an uppermost sheet and a bottom surface of a lowermost sheet;

deforming the sheets over at least a portion of the overlapped region to displace overlapping sheet material out of the plane of the overlapping planar region and to form a hole in the displaced material, the displaced sheet material thereby having interlocking features that mechanically resist sliding of the deformed sheets along their contacting faces, the hole having a shape and a dimension;

inserting through the hole, an elongated, deformable, fiber reinforced polymer body, the polymer body having a length, a cross-section of complementary shape to the shape of the hole, and a cross-section dimension smaller than the hole dimension;

locating the deformable polymer body in the hole so that suitable portions of the length of the body extend on either side the deformed sheets to provide attachment material for joining the overlapping sheets; and upsetting the ends of the deformable body to form two heads, each positioned on one end of the deformable body, each head having an underside; and continuing to upset the ends of the deformable, fiber-reinforced polymer body until the underside of one head contacts the top surface of the overlapped region and the underside of the second head contacts the bottom surface of the overlapped region.

2. The method of claim 1 in which the method of forming the interlocking features comprises:

forming a hole through all sheets in the overlapped region;

applying a flat-bottomed punch with a shape and a dimension to the top surface of the overlapped region while supporting the bottom surface of the overlapped region with a die of complementary shape to the punch, the die having a die opening with a dimension greater than the dimension of the punch;

and displacing the sheets into the die opening to form a protrusion on the bottom surface of each sheet and a complementary depression on the top surface of each sheet, so sized that the protruding and depressed features of contacting sheets will nest together.

3. The method of claim 1 in which the method of forming the interlocking features comprises:

forming an opening in the overlapped region and extending through all sheets in the overlapped region, the opening having a centerline and each sheet having a cut edge surrounding the opening;

bending each sheet about a bend line centered on the opening center line to form, in each sheet, a flange extending from the top surface of each sheet and in a direction from the top surface of the sheet to the bottom surface of the sheet and terminating in the sheet cut edge, the flanges in contacting sheets being nested; and the interior flange surface formed by the top surface of the overlapped region in the topmost sheet defining a hole for insertion of the fiber-reinforced polymer body, the hole extending through all of the sheets in the overlapped region; and in which the length of the fiber-reinforced polymer body which extends beyond the bottom surface of the overlapped region is selected to enable the cut edges of each sheet to be embedded in the second upset head of the deformable, fiber-reinforced polymer body.

4. The method of claim 3 further comprising the step of further deforming the nested flanges to form a rolled-over flange.

5. The method of claim 2 in which the fiber-reinforced polymer body is a thermoplastic and comprises one of the group consisting of polyesters, polyamides or polypropylene, polyphthalamide, polyphenylene sulfide, polyamide-imide, polyether sulphone and polyarylene ketone; and, further comprises the steps of heating the polymer body to a temperature greater than its glass transition temperature before upsetting and cooling the polymer body to a temperature below its glass transition temperature after upsetting.

6. The method of claim 3 in which the fiber-reinforced polymer body is a thermoplastic and comprises one of the group consisting of polyesters, polyamides or polypropylene, polyphthalamide, polyphenylene sulfide, polyamide-imide, polyether sulphone and polyarylene ketone; and, further comprises the steps of heating the polymer body to a temperature greater than its glass transition temperature before upsetting and cooling the polymer body to a temperature below its glass transition temperature after upsetting.

7. The method of claim 4 in which the fiber-reinforced polymer body is a thermoplastic and comprises one of the group consisting of polyesters, polyamides or polypropylene, polyphthalamide, polyphenylene sulfide, polyamide-imide, polyether sulphone and polyarylene ketone; and, further comprises the steps of heating the polymer body to a temperature greater than its glass transition temperature before upsetting and cooling the polymer body to a temperature below its glass transition temperature after upsetting.

8. The method of claim 2 in which the fiber-reinforced polymer body is a partially-cured, or otherwise thickened, theromoset and comprises one of the group consisting of epoxy resins, polyester resins and vinyl ester resins; and further comprises the step of curing the thermoset after upsetting.

9. The method of claim 3 in which the fiber-reinforced polymer body is a partially-cured, or otherwise thickened, theromoset and comprises one of the group consisting of epoxy resins, polyester resins and vinyl ester resins; and, further comprises the step of curing the thermoset after upsetting.

10. The method of claim 4 in which the fiber-reinforced polymer body is a partially-cured, or otherwise thickened, theromoset and comprises one of the group consisting of epoxy resins, polyester resins and vinyl ester resins; and, further comprises the step of curing the thermoset after upsetting.

11. The method of claim 2 in which the fiber-reinforced polymer body is reinforced by one of the group of fibers consisting of bast, glass, aramid and graphite.

12. The method of claim 3 in which the fiber-reinforced polymer body is reinforced by one of the group of fibers consisting of bast, glass, aramid and graphite.

13. The method of claim 4 in which the fiber-reinforced polymer body is reinforced by one of the group of fibers consisting of bast, glass, aramid and graphite.

14. The method of claim 3 in which the opening is non-circular.

15. The method of claim 4 in which the opening is non-circular.

16. The method of claim 2 in which the hole is round and has a diameter and the fiber-reinforced polymer body is a cylinder with a diameter in the range of between 85 and 99% of the opening diameter and the polymer body extends beyond the top and bottom surfaces of the overlapped region by a distance of between about 1.2 to 2 times the opening diameter.

17. The method of claim 3 in which the hole is round and has a diameter and the fiber-reinforced polymer body is a cylinder with a diameter in the range of between 85 and 99% of the opening diameter and the polymer body extends beyond the top surface of the overlapped region by a distance of between about 1.2 to 2 times the opening diameter.

18. The method of claim 4 in which the hole is round and has a diameter and the fiber-reinforced polymer body is a cylinder with a diameter in the range of between 85 and 99% of the opening diameter and the polymer body extends beyond the top surface of the overlapped region by a distance of between about 1.2 to 2 times the opening diameter.

19. The method of claim 1 in which at least the magnesium sheet is heated to a temperature greater than about 25° C.

20. The method of claim 1 in which at least the magnesium sheet is heated to a temperature of about 250° C.

* * * * *